(12) United States Patent
Xu (10) Patent No.: US 12,030,165 B2
(45) Date of Patent: Jul. 9, 2024

(54) FASTENER DRIVING MACHINE

(71) Applicant: TOGROUP TECHNOLOGY (SUZHOU) CO., LTD, Suzhou (CN)

(72) Inventor: Ying Xu, Dongguan (CN)

(73) Assignee: TOGROUP TECHNOLOGY (SUZHOU) CO., LTD, Suzhou (CN)

( * ) Notice: Subject to any disclaimer, the term of this patent is extended or adjusted under 35 U.S.C. 154(b) by 108 days.

(21) Appl. No.: 17/114,521

(22) Filed: Dec. 8, 2020

(65) Prior Publication Data

US 2022/0176530 A1    Jun. 9, 2022

(51) Int. Cl.
*B25C 1/04*     (2006.01)
*F16H 37/12*    (2006.01)

(52) U.S. Cl.
CPC ........... *B25C 1/047* (2013.01); *F16H 37/124* (2013.01)

(58) Field of Classification Search
CPC .. B25C 1/047; B25C 1/04; B25C 1/06; B25C 1/001; B25C 1/008
See application file for complete search history.

(56) References Cited

U.S. PATENT DOCUMENTS

2016/0288305 A1*  10/2016  McCardle .............. B25C 1/047
2020/0147774 A1*   5/2020  Shi ........................... B25C 7/00

* cited by examiner

*Primary Examiner* — Veronica Martin
(74) *Attorney, Agent, or Firm* — Flaster Greenberg P.C.

(57) ABSTRACT

A fastener driving machine, which comprises an energy storage unit; an impact unit used to drive the energy storage unit to store energy and withstand the energy released by the energy storage unit to drive fasteners into a workpiece; a driving mechanism connected to the impact unit; a rotating power mechanism connected to the driving mechanism to provide rotating power to the driving mechanism. The driving mechanism comprises a stationary annular gear, a crank connected to the rotating power mechanism, and at least one planetary gear which is connected to the crank in a spinning manner and revolves with the rotation of the crank relative to the annular gear, and an engaging shaft eccentrically connected to the planetary gear to push the impact unit. The planetary gear is placed in the annular gear to mesh with the annular gear.

9 Claims, 13 Drawing Sheets

FASTENER DRIVING MACHINE

BACKGROUND OF INVENTION

1. Field of the Invention

The present invention relates to the technical field of mechanical tool products, and more particularly to a fastener driving machine.

2. Description of Related Art

In a fast fastening machine, it is usually necessary to push or pull the energy storage unit to store energy, and then quickly release it to perform external work.

When the energy storage unit is compressed and released in a fast fastening machine, it usually needs to move in a linear or approximate linear way, and the power commonly used is the motor to output a rotary motion. Therefore, a driving mechanism is needed to convert the rotary motion into a reciprocating motion, and the common mechanism is the crank-connecting rod structure. However, this structure will have a large deflection angle during the movement, and will cause problems of large friction force during the movement of the driven parts and wear of the mechanism. In addition, after compressing the energy storage unit, the driving mechanism needs to be released quickly to achieve the purpose of performing external work. Many fast fastening machines are usually designed to install a release element for this purpose, making the structure more complicated and not conducive to reducing costs.

In view of this, the inventor proposes the following technical solutions.

SUMMARY OF THE INVENTION

In view of the above disadvantages, the technical issue to be resolved by the present invention is to provide a comprising: an energy storage unit; an impact unit used to drive the energy storage unit to store energy and withstand the energy released by the energy storage unit to drive the fastener into a workpiece; a driving mechanism, which is connected to the impact unit; a rotating power mechanism, which is connected to the driving mechanism to provide rotating power to the driving mechanism; its features are: the driving mechanism comprises a stationary annular gear, a crank connected to the rotating power mechanism, and at least one planetary gear which is connected to the crank in a spinning manner and revolves with the rotation of the crank relative to the annular gear, and an engaging shaft eccentrically connected to the planetary gear to push the impact unit, the planetary gear is placed in the annular gear to mesh with the annular gear.

More particularly, wherein the ratio of rotation angle to revolution angle of the planetary gear is (1:1)-(7:1) or (0.1:1)-(0.5:1).

More particularly, wherein the ratio of the reference diameter of the annular gear to the reference diameter of the planetary gear is (2:1)-(8:1) or (1.1:1)-(1.5:1).

More particularly, wherein the planetary gear is provided with a connecting rod, and the engaging shaft is mounted on the connecting rod.

More particularly, wherein a connecting arm is formed on the crank, the connecting arm is provided with a rotatable planetary gear, the planetary gear is provided with a connecting rod, and the connecting rod is provided with an engaging shaft to form a planetary gear-connecting rod assembly.

More particularly, wherein the crank is formed with more than two connecting arms, and each connecting arm is provided with a rotatable planetary gear, the planetary gear is provided with a connecting rod, and the connecting rod is provided with an engaging shaft to form more than two sets of planetary gear-connecting rod assembly.

More particularly, wherein the rotating power mechanism comprises a motor, the rotating shaft of the motor is an output shaft, the crank is connected to the output shaft; or, the rotating power mechanism comprises a reducer, a motor installed to match with the reducer, and an output shaft installed on the reducer, the crank is connected to the output shaft, the reducer is provided with several layers of planetary gear transmission modules.

More particularly, wherein the impact unit comprises an impact rod, the side of the impact rod being provided with a groove, the engaging shaft is placed in the groove; or, the side of the impact rod is provided with a convex tooth, and the engaging shaft is meshed with the convex tooth.

More particularly, wherein the energy storage unit is any one of an air spring, a mechanical spring, a rubber element, or a vacuum device; wherein, when the energy storage unit is an air spring, it comprises a cylinder block and a piston installed in the cylinder block, one end of the impact rod is fixedly connected to the piston, and the other end of the impact rod extends out of the cylinder block.

More particularly, wherein it further comprises a nail guide plate and a nail cartridge arranged at the lower end of the nail guide plate for conveying fasteners (usually nails) to the nail guide plate, the nail guide plate is provided with a passage for the impact rod of the impact unit to pass through.

After the adoption of the above-mentioned technical scheme, the present invention has the following benefits:

The present invention uses the annular gear-crank-planetary gear structure to achieve the conversion of rotary motion into reciprocating motion, and the unbalanced load is much smaller than that of the traditional crank-connecting rod structure, which can minimize the friction force of movement under load, avoid wear, ensure the stability and smoothness of the impact unit operation, and improve the working quality. In addition, the quick release of the driving mechanism is achieved without detaching the components, which simplifies the structure and has extremely strong market competitiveness.

DETAILED DESCRIPTION OF THE INVENTION

The following descriptions are made in combination with the attached drawings.

FIGS. 1-18 show a fastener driving machine, which comprises: an energy storage unit 1; an impact unit 2 used to drive the energy storage unit 1 to store energy and withstand the energy released by the energy storage unit 1 to drive the fastener into a workpiece; a driving mechanism 3 connected to the impact unit 2; a rotating power mechanism 4 connected to the driving mechanism 3 to provide rotating power to the driving mechanism 3. The fastener driving machine also comprises a nail guide plate 61 mounted on one side of the base 5 and a nail cartridge 62 arranged at the lower end of the nail guide plate 61 for conveying fasteners (usually nails) to the nail guide plate 61. The nail guide plate 61 is provided with a passage for the impact rod 21 of the impact unit 2 to pass through.

In combination with FIGS. 1-4, the driving mechanism 3 is a mechanism that converts rotary motion into a linear motion or approximate linear motion. Specifically, the driving mechanism 3 comprises a stationary annular gear 31, a crank 32 connected to the rotating power mechanism 4, and at least one planetary gear 33 which is connected to the crank 32 in a spinning manner and revolves with the rotation of the crank 32 relative to the annular gear 31, and an engaging shaft 34 eccentrically connected to the planetary gear 33 to push the impact unit 2. The planetary gear 33 is placed in the annular gear 31 to mesh with the annular gear. When the engaging shaft 34 is engaged with the impact unit, the impact unit can move along the first direction to store energy; when the engaging shaft 34 is separated from the impact unit, the impact unit, under the force of the energy storage unit, moves along the second direction to achieve the fastener driving function.

The energy storage unit 1 is any one of an air spring, a mechanical spring, a rubber element, or a vacuum device. If the energy storage unit 1 is an air spring, it comprises a cylinder block 11 installed on the base 5 and a piston 12 installed in the cylinder block 11. One end of the impact rod 21 is fixedly connected to the piston 12, and the other end extends out of the cylinder block 11. The base 5 is installed with a buffer block 51 for contacting the piston 12.

When the piston in the energy storage unit 1 is not compressed by the impact unit, the piston adheres to the buffer block, and the position of the current impact unit is called the lower dead center. The limit position where the impact unit is pushed backwards (toward the first direction of the energy storage unit 1) by the driving mechanism is called the upper dead center. When the impact unit moves towards the upper dead center to compress the air and store energy, the movement direction of the impact unit is defined as the first direction. When the impact unit is under the action of air pressure to move towards the lower dead center in order to drive the fastener into the workpiece through the nail guide plate, this movement direction is defined as the second direction.

The ratio of rotation angle to revolution angle of planetary gear 33 is (1:1)-(7:1) or (0.1:1)-(0.5:1). Specifically, the ratio of rotation angle to revolution angle of the planetary gear 33 is 1:1, or 2:1, or 3:1, or 4:1, or 5:1, or 6:1, or 7:1, or ⅒:1, or ⅑:1, or ⅛:1, or ⅐:1, or ⅙:1, or ⅕:1, or ¼:1, or ⅓:1, or ½:1, etc.

The ratio of the reference diameter of the annular gear 31 to the reference diameter of the planetary gear 33 is (2:1)-(8:1) or (1.1:1)-(1.5:1). Specifically, the ratio of the reference diameter of the annular gear 31 to the reference diameter of the planetary gear 33 is 2:1, or 3:1, or 4:1, or 5:1, or 6:1, or 7:1, or 8:1; or, the ratio of the reference diameter of the annular gear 31 to the reference diameter of the planetary gear 33 is 3:2, 4:3, 5:4, 6:5, 7:6, 8:7, 9:8, 10:9 etc.

Figure 5:
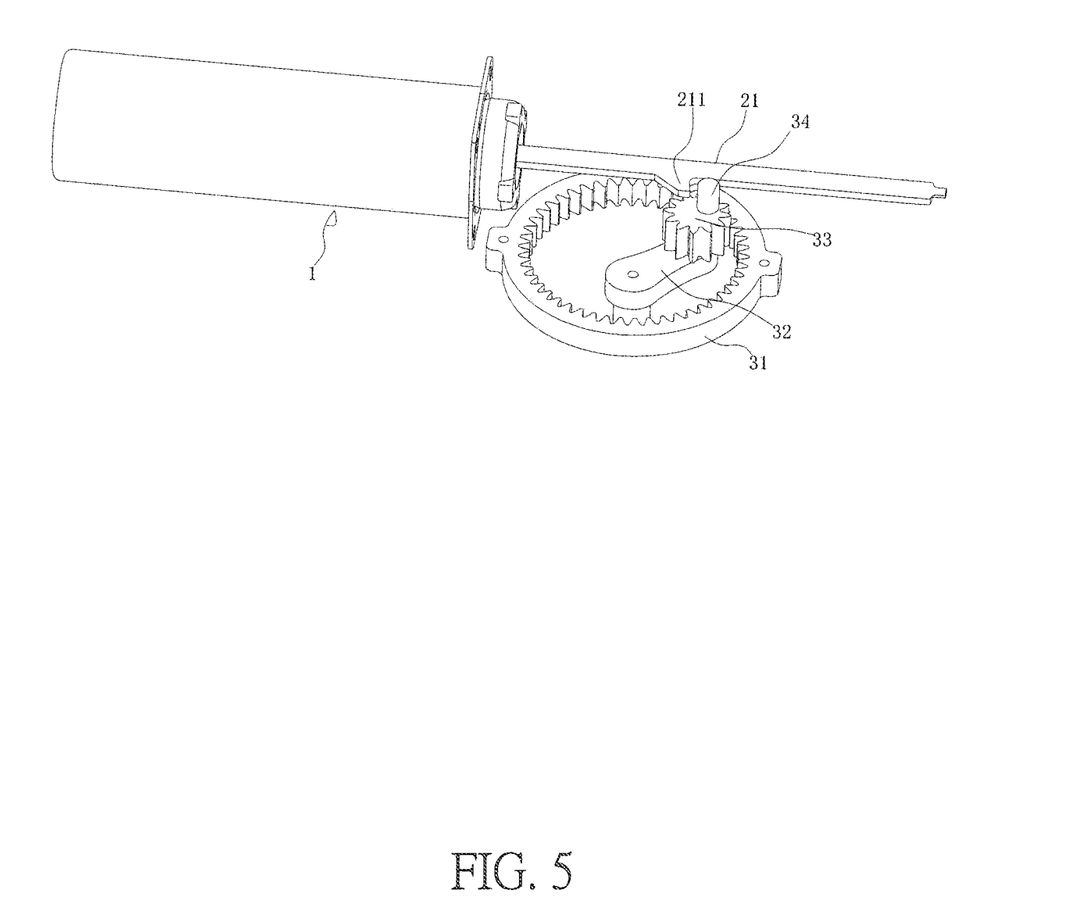
FIG. 5 is an internal structure diagram of the present invention (without connecting rod)

The planetary gear 33 is provided with a connecting rod 35, and the engaging shaft 34 is mounted on the connecting rod 35. It is worth noting that the connecting rod 35 is essentially just an extension of the planetary gear in the radial direction to facilitate the connection of the engaging shaft. When the planetary gear is large enough and the distance from the center of the engaging shaft to the rotation center of the planetary gear is small, the engaging shaft can be directly connected to the planetary gear and rotate together with the planetary gear, as shown in FIG. 5.

Figure 3:
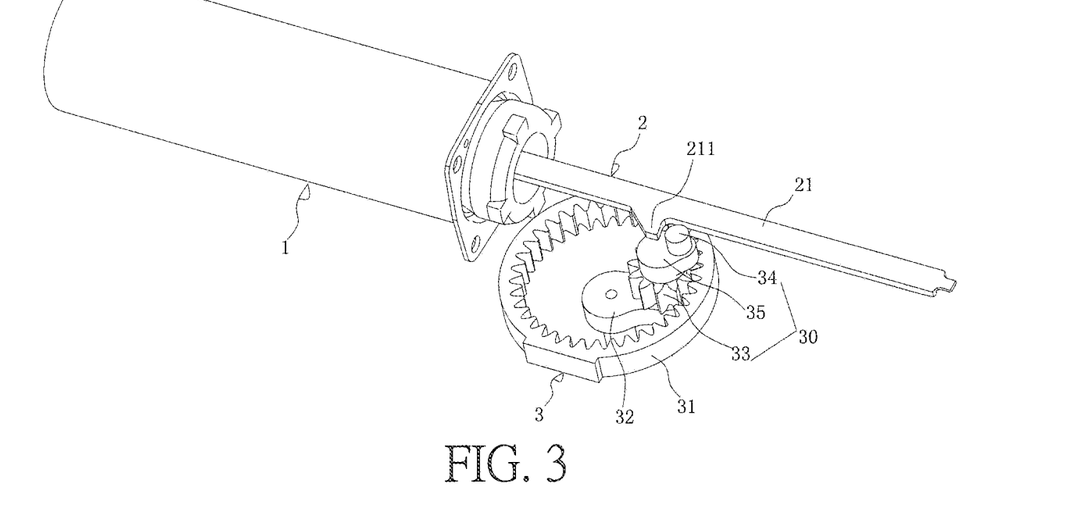
FIG. 3 is an internal structure diagram of the present invention.
Figure 4:
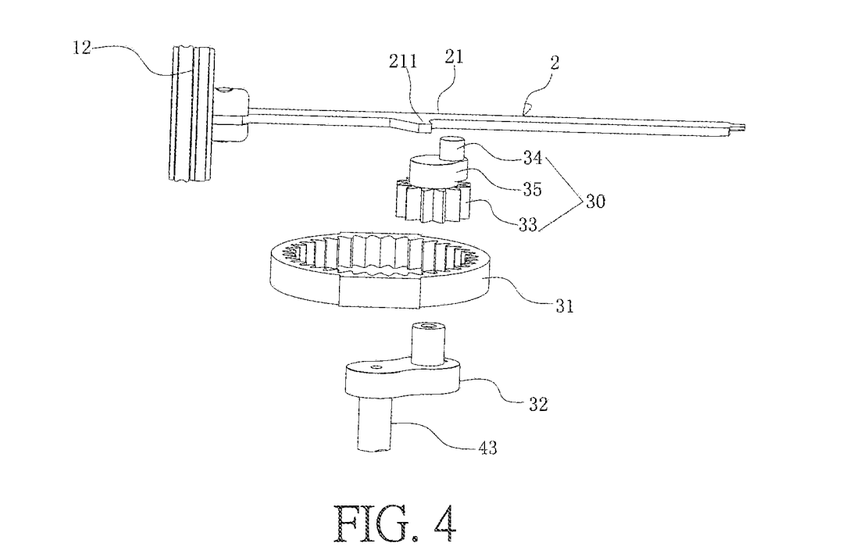
FIG. 4 is an exploded view of the internal structure of the present invention.

A connecting arm 321 is formed on the crank 32. The connecting arm 321 is provided with a rotatable planetary gear 33. The planetary gear 33 is provided with a connecting rod 35, and the connecting rod 35 is provided with an engaging shaft 34 to form a planetary gear-connecting rod assembly 30, as shown in FIG. 3. Or, the crank 32 is formed with more than two connecting arms 321, and each connecting arm 321 is provided with a rotatable planetary gear 33. The planetary gear 33 is provided with a connecting rod 35, and the connecting rod 35 is provided with an engaging shaft 34 to form more than two sets of planetary gear-connecting rod assembly 30, as shown in FIGS. 11-15.

Figure 1:
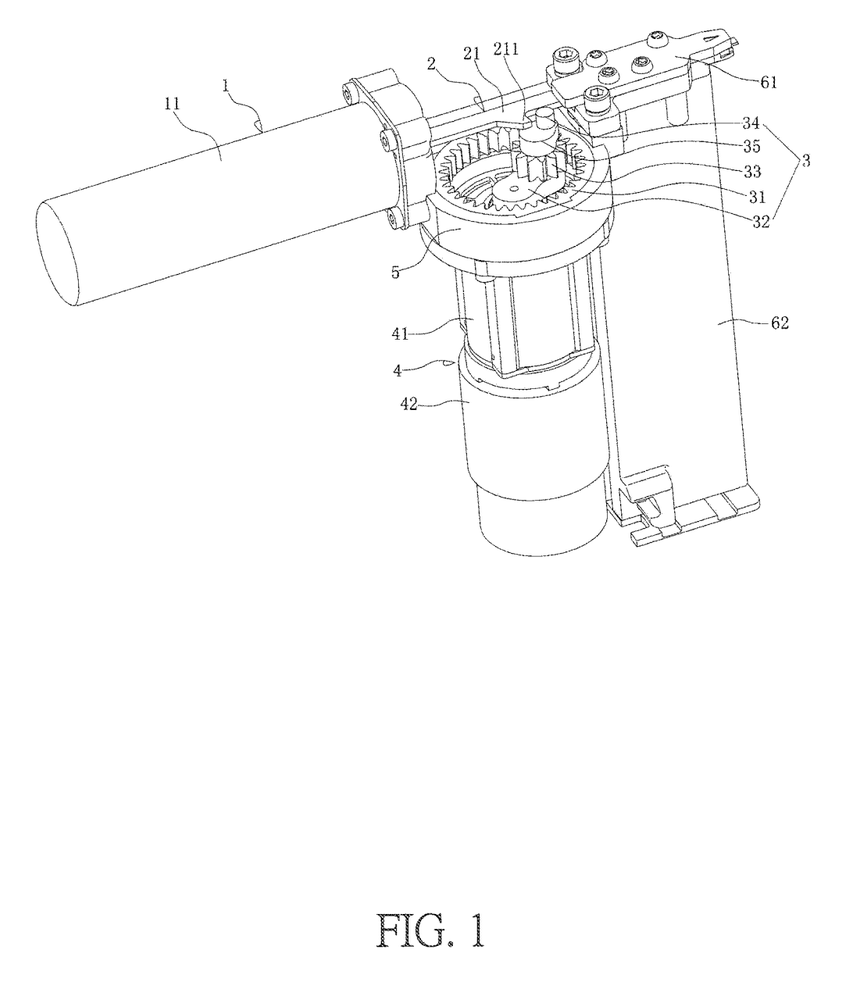
FIG. 1 is a perspective view of the present invention.
Figure 2:
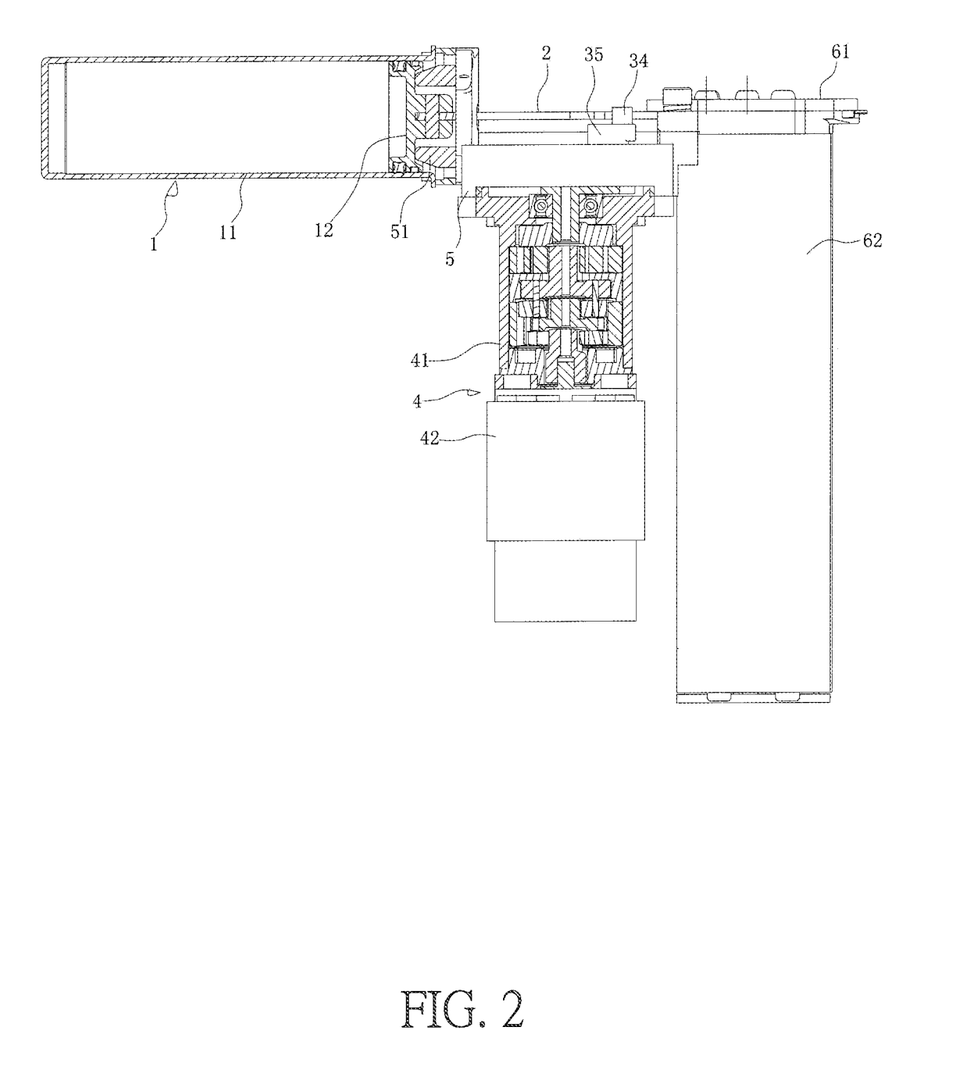
FIG. 2 is a sectional view of the present invention.

As shown in FIGS. 1-2, the rotating power mechanism 4 comprises a reducer 41 installed at the lower end of the base 5, a motor 42 installed to match with the reducer 41, and an output shaft 43 installed on the reducer 41. The crank 32 is connected to the output shaft 43. The reducer 41 is provided with several layers of planetary gear transmission modules. The motor is used to provide torque and rotation speed, and the reducer is used to reduce the rotation speed while increasing the torque. The output shaft connects the reducer and the driving mechanism, and transmits the rotary motion to the driving mechanism. It is worth noting that for a motor with sufficient power, the reducer may not be needed if combining with adequate output power, and the rotating shaft of the motor can be directly used as the output shaft. The driving mechanism is installed in the base and connected with the output shaft to convert the rotary motion transmitted by the output shaft into approximate linear motion, thereby pushing the impact unit to move.

The impact unit 2 comprises an impact rod 21, the side of the impact rod 21 being provided with a groove. The engaging shaft 34 is placed in the groove; or, the side of the impact rod 21 is provided with a convex tooth 211, and the engaging shaft 34 is meshed with the convex tooth 211.

When the ratio of the reference diameter of the annular gear 31 to the reference diameter of the planetary gear 33 is 2:1, the motion trajectory of the engaging shaft is a straight line, which can minimize the friction force of the motion under load and avoid wear problem. It can ensure the stability and smoothness of the operation of the impact unit, improve working quality, and possess strong market competitiveness.

When the ratio of the reference diameter of the annular gear 31 to the reference diameter of the planetary gear 33 is greater than 2:1, such as 3:1, 4:1, 5:1, etc., the following patterns can be observed.

Figure 6:
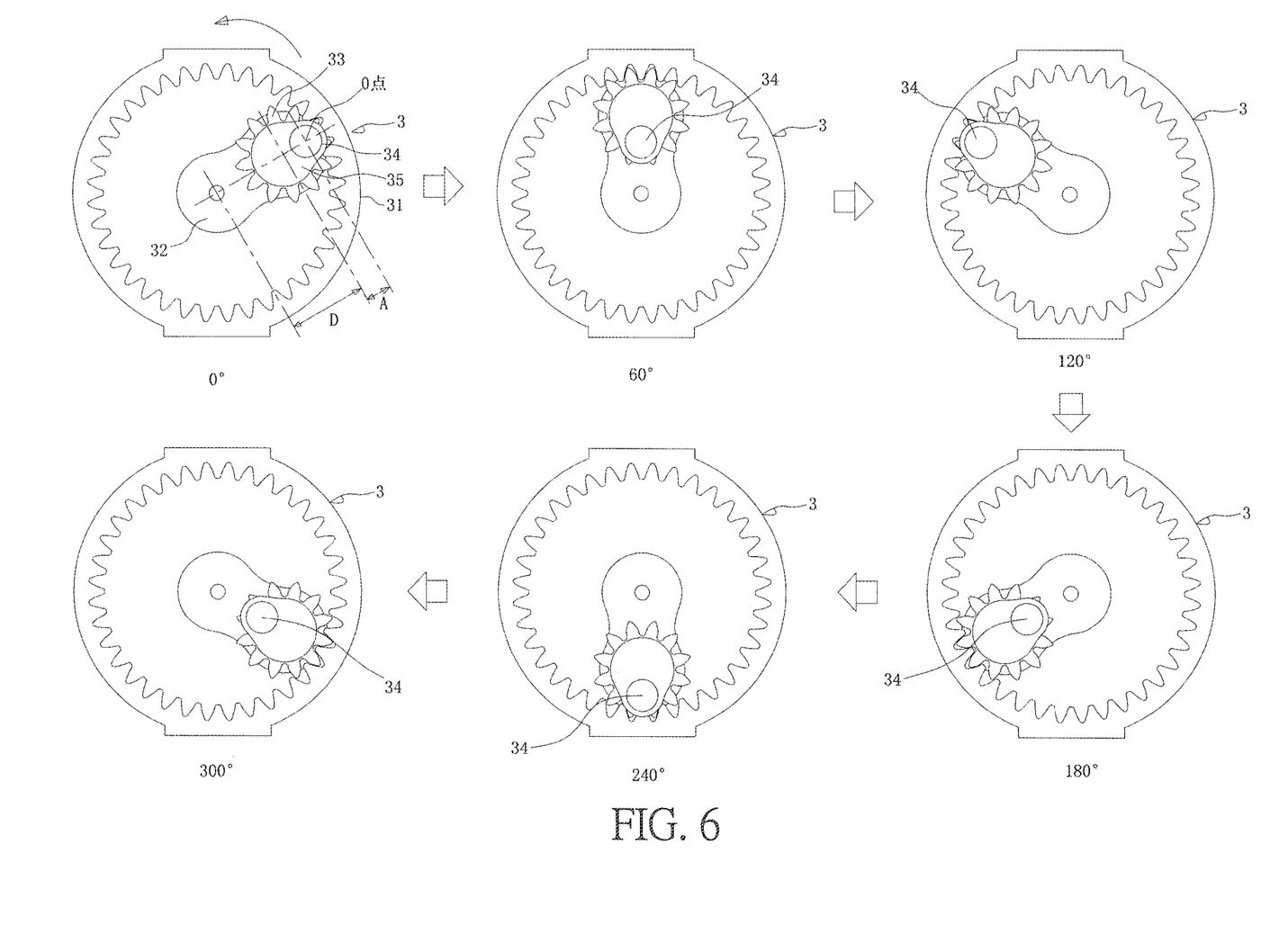
FIG. 6 is step diagrams of the working principle of the present invention (gear ratio is 3:1)

As shown in FIG. 6, the center of the engaging shaft 34 is point O, the distance from point O to the center of rotation of the planetary gear 33 is A, and the center distance between the annular gear 31 and the planetary gear 33 is D.

Figure 7:
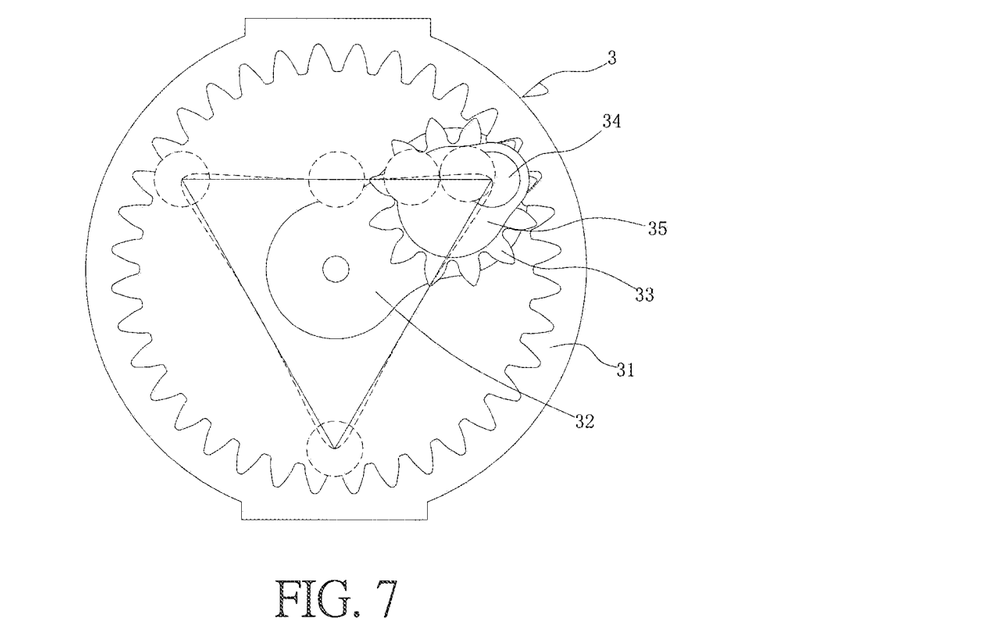
FIG. 7 is a trajectory diagram of the working principle of the present invention (gear ratio is 3:1)

As shown in FIG. 6 and FIG. 7, when the ratio of the reference diameter of the annular gear 31 to the reference diameter of the planetary gear 33 is 3:1, that is, the gear ratio is 3:1, the crank drives the planetary gear and the connecting rod to rotate, and the motion trajectory of point O is an approximate triangle. The approximate triangle is an equilateral triangle with side length of $2*(D+A)*\sin 60°$. In practical application, the energy storage unit can be compressed by using a part of a side or the entire side of this approximate triangle. It should be noted that the degree of approximation between the trajectory of point O and the triangle is related to the ratio of D to A. As can be easily seen from FIG. 7, when the crank is located at 0°, 120°, 240°, the position of the center O of the engaging shaft is the three vertices of the triangle. Now, let the crank at 60°, 180°, 300°, the position of point O falls at the midpoint of each corresponding side of the triangle, and a motion trajectory with a satisfactory approximation can be obtained, where $D=3A$. The dotted triangle line shows the motion trajectory of point O, the dotted circular line shows virtual position passed by the engaging shaft, and the solid triangular line shows the approximate polygon.

Figure 8:
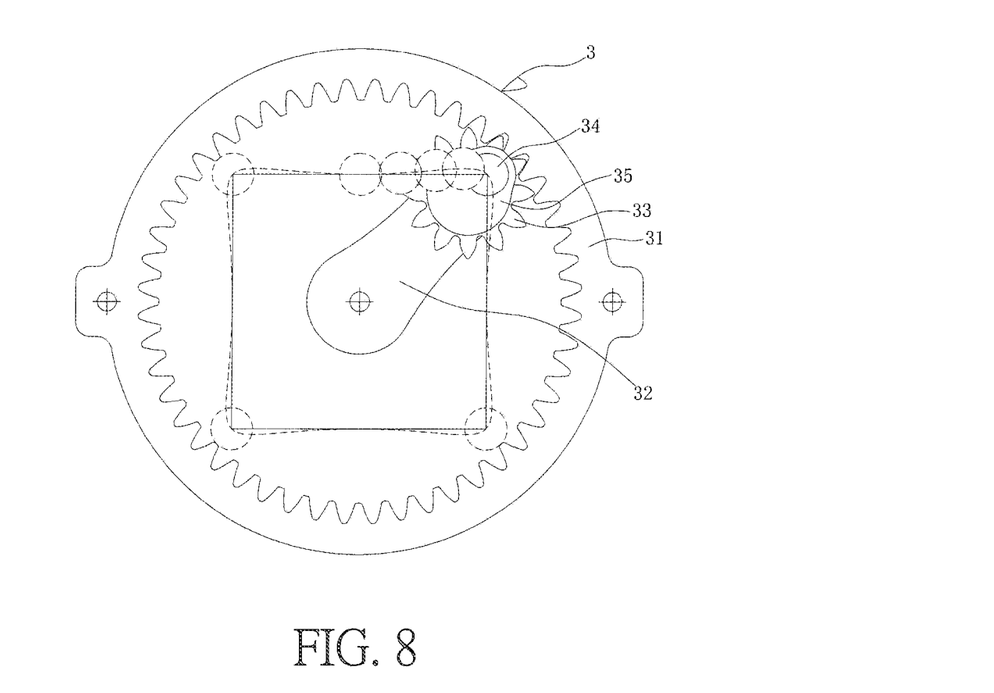
FIG. 8 is step diagrams of the working principle of the present invention (gear ratio is 4:1)

Similarly, as shown in FIG. 8, when the ratio of the reference diameter of the annular gear 31 to the reference diameter of the planetary gear 33 is 4:1, that is, the gear ratio is 4:1, the motion trajectory of point O is an approximate quadrilateral, and the approximate quadrilateral is a square with side length of $2*(D+A)*\sin 45°$. Similarly, each vertex and the midpoint of each side of the quadrilateral can be used as the control points for the motion trajectory of point O, thus obtaining a quadrilateral motion trajectory with a higher degree of approximation, where $D=5.826A$. In general, when the gear ratio is n:1, let $D:A=(1+\cos(180°/n)):(1-\cos(180°/n))$, a motion trajectory with a higher approximation to the n-polygon with a side length of $2*(2/(1-\cos(180°/n)))*A*\sin(180°/n)$ can be obtained. It is worth noting that the above equations about D:A do not need to be exactly equal. Approximately equal might be OK as well, merely changing the degree of approximation of the motion trajectory of point O to the polygon.

In addition, it should be pointed out that the annular gear and the planetary gear described in the present invention are not limited to gears. As long as the principles are the same, other forms of wheels such as friction wheels and belt wheels can be included in the scope of the patent application of the present invention.

Figure 9:
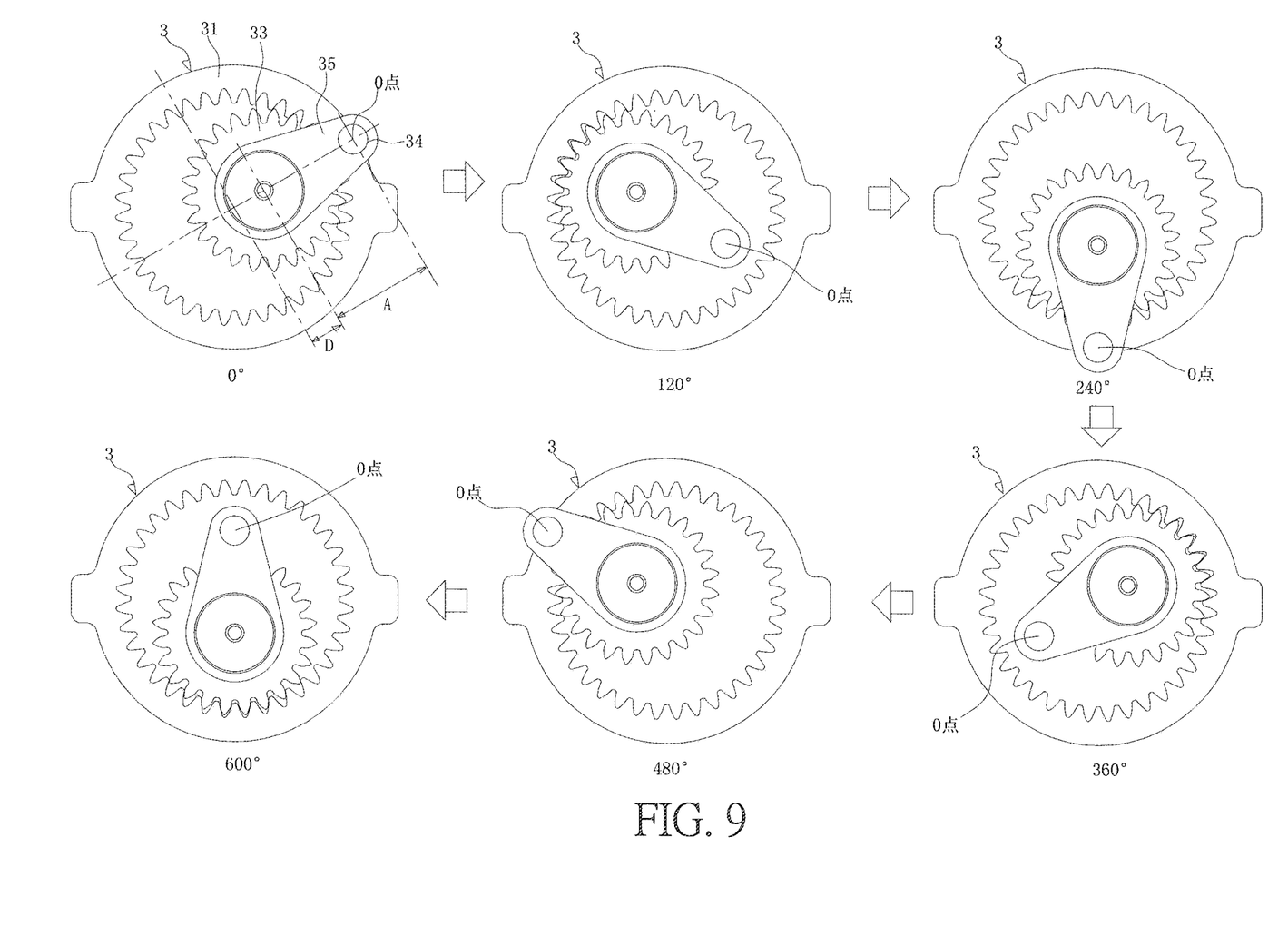
FIG. 9 is a trajectory diagram of the working principle of the present invention (gear ratio is 3:2)
Figure 10:
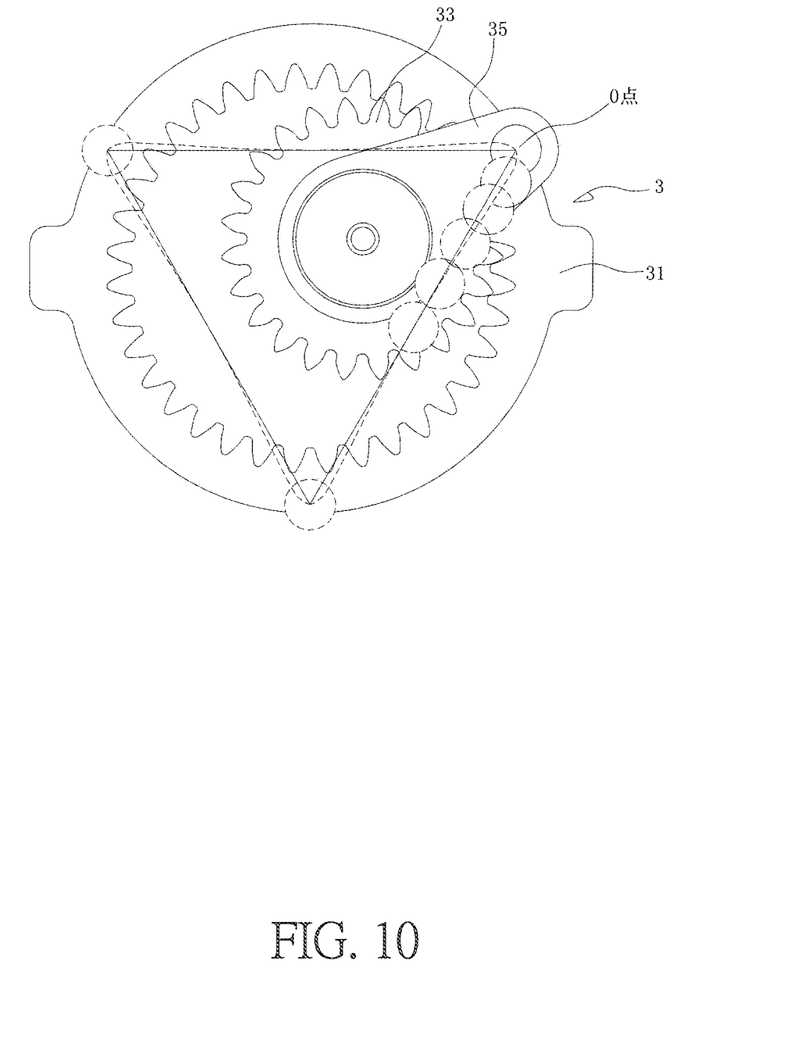
FIG. 10 is step diagrams of the working principle of the present invention (gear ratio is 3:2)

When the ratio of the reference diameter of the annular gear 31 to the reference diameter of the planetary gear 33 is less than 2:1, that is, when the gear ratio is less than 2:1, such as 3:2, 4:3, 5:4 etc., the following patterns can be observed As shown in FIG. 9 and FIG. 10, when the gear ratio is 3:2, the crank drives the planetary gear and the connecting rod to rotate, and the motion trajectory of point O is approximately triangular. The approximate triangle is an equilateral triangle with side length of $2*(D+A)*\sin 60°$. In practical application, the energy storage unit can be compressed by using a part of a side or the entire side of this approximate triangle. The difference from the case where the gear ratio is greater than 2:1 is that to obtain a complete approximate triangle trajectory, the crank needs to rotate more than one turn. When the gear ratio is 3:2, it needs to rotate 2 turns to get a complete trajectory. It should be noted that the degree of approximation between the trajectory of point O and the triangle is related to the ratio of D to A. As can be easily seen from FIG. 10, when the crank is located at 0°, 240°, 480°, the position of the center O of the engaging shaft is the three vertices of the triangle. Now, let the crank at 120°, 360°, and 600°, the position of point O falls at the midpoint of each corresponding side of the triangle, and a motion trajectory with a satisfactory approximation can be obtained, where $D=A/3$. The dotted triangle line shows the motion trajectory of point O, the dotted circular line shows virtual position passed by the engaging shaft, and the solid triangular line shows the approximate polygon.

In general, when the gear ratio is n:(n−1), let $D:A=(1-\cos(180°/n)):(1+\cos(180°/n))$, a motion trajectory with a higher approximation to the n-polygon with a side length of $2*(2/(1+\cos(180°/n)))*A*\sin(180°/n)$ can be obtained. To obtain a complete trajectory of the approximate n-polygon, the crank needs to rotate n−1 turns. It is worth noting that the above equations about D:A do not need to be exactly equal. Approximately equal might be OK as well, merely changing the degree of approximation of the motion trajectory of point O to the polygon.

It can be seen from the previous analysis that for the ratio of the reference diameter of the annular gear 31 to the reference diameter of the planetary gear 33 equal to n:1, that is, the gear ratio is n:1, when the crank rotates one turn, the motion trajectory of point O is approximately polygonal. If only one of the sides is used to compress the impact unit, then the other sides do not perform work, and the corresponding cranks are only idling at these rotation angles, which is not efficient.

By connecting a plurality of planetary gear-connecting rod assemblies 30 to the crank, or connecting a plurality of planetary gear-connecting rod assemblies 30 to the output shaft, multiple sides of the approximate polygon can be used to achieve multiple compressions of the impact unit, with the result of the rotation angle of the crank being effectively exploited.

Figure 11:
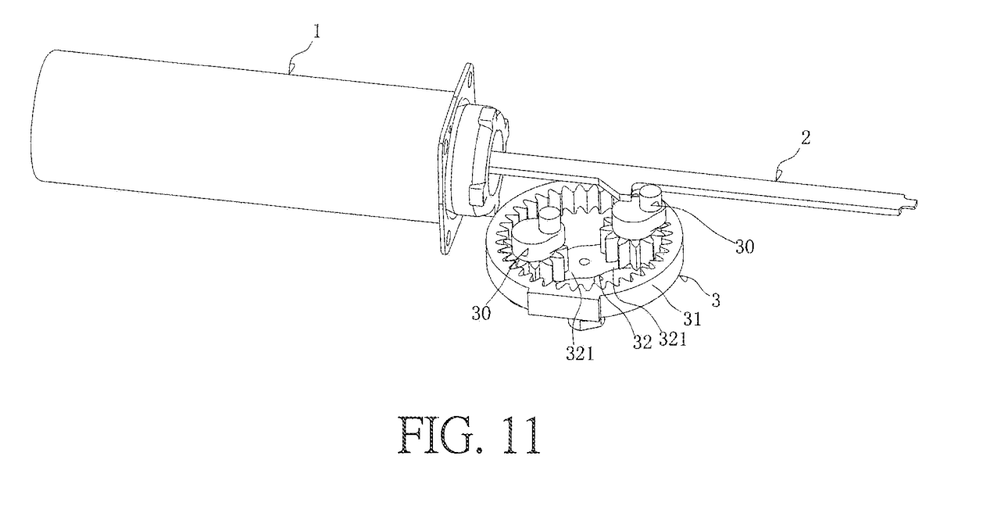
FIG. 11 is an internal structure diagram of the present invention (gear ratio is 3:1, two planetary gear-connecting rod assemblies)
Figure 12:
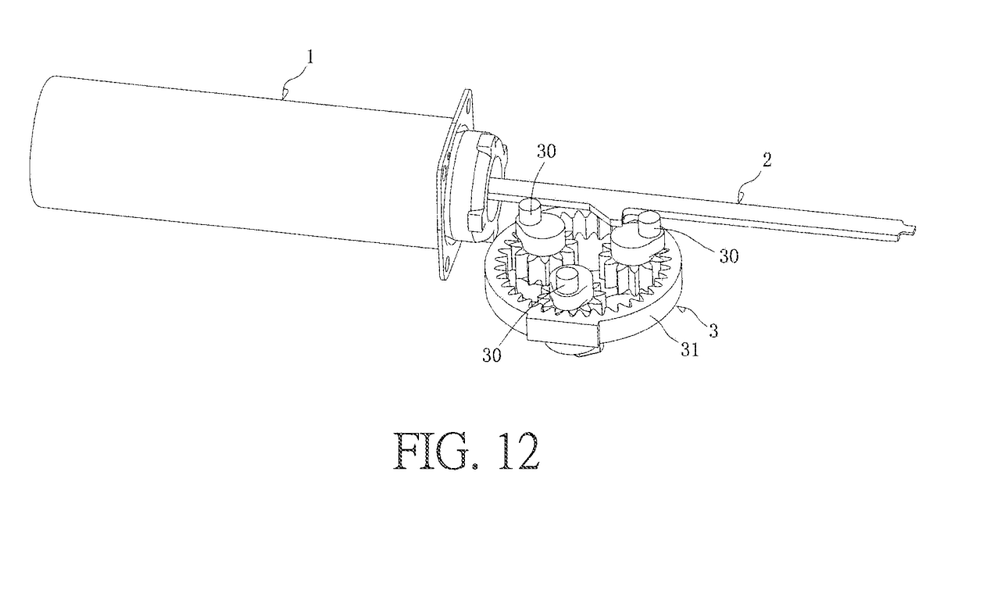
FIG. 12 is an internal structure diagram of the present invention (gear ratio is 3:1, three planetary gear-connecting rod assemblies)

Taking the structure with a gear ratio of 3:1 as an example, as shown in FIG. 11, two planetary gear-connecting rod assemblies 30 are distributed along the circumference of the crank. Giving priority to the distribution angle of these two assemblies greater than or equal to 120° can utilize the two sides of the approximate triangle to push the impact unit separately. In FIG. 11, the angle between the two planetary gear-connecting rod assemblies 30 is selected to be 180°. When the first planetary gear-connecting rod assembly pushes the impact unit to the upper dead center, the impact unit comes to the lower dead center under the force of the energy storage unit, and the crank continuing rotation allows the second planetary gear-connecting rod assembly to engage with the impact unit and push the impact unit to compress the energy storage unit. It is easy to know that when the crank rotates one turn, there can be two 120°, that is, a total of 240° is used to perform work, so the efficiency is improved. As shown in FIG. 12, three planetary gear-connecting rod assemblies 30 are distributed along the circumference of the crank. Giving priority to the distribution angle of these three planetary gear-connecting rod assemblies 30 equal to 120° can maximize the use of the three sides of the approximate triangle to push the impact unit separately. One can further increase the number of the planetary gear-connecting rod assemblies, but this will cause the distribution angle between the assemblies less than 120°, and the driving stroke between the assemblies will overlap, which is not conducive to the improvement of efficiency. Therefore, in this situation, the number of planetary gear-connecting rod assemblies should be less than or equal to 3.

Figure 13:
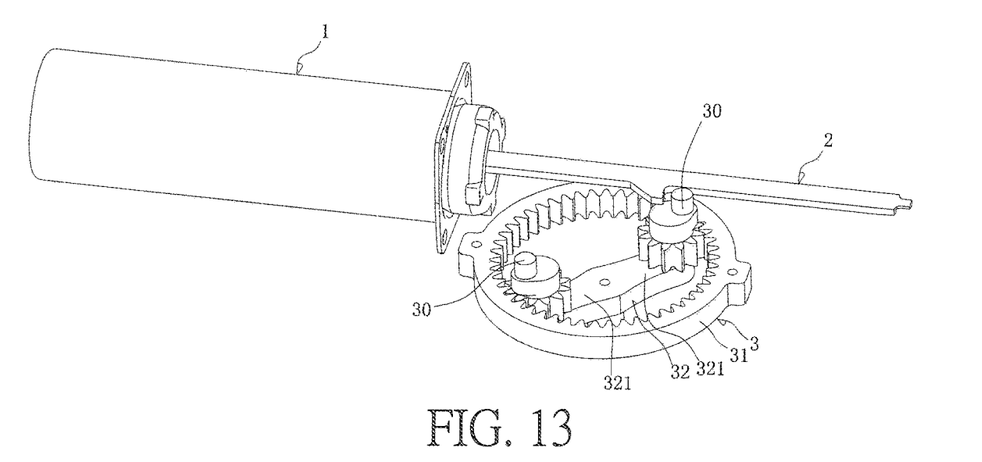
FIG. 13 is an internal structure diagram of the present invention (gear ratio is 4:1, two planetary gear-connecting rod assemblies)
Figure 14:
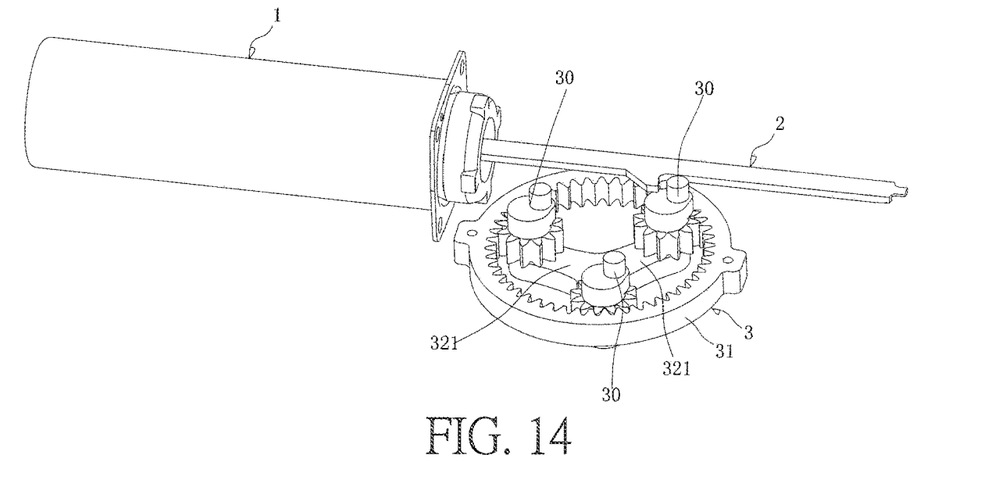
FIG. 14 is an internal structure diagram of the present invention (gear ratio is 4:1, three planetary gear-connecting rod assemblies)
Figure 15:
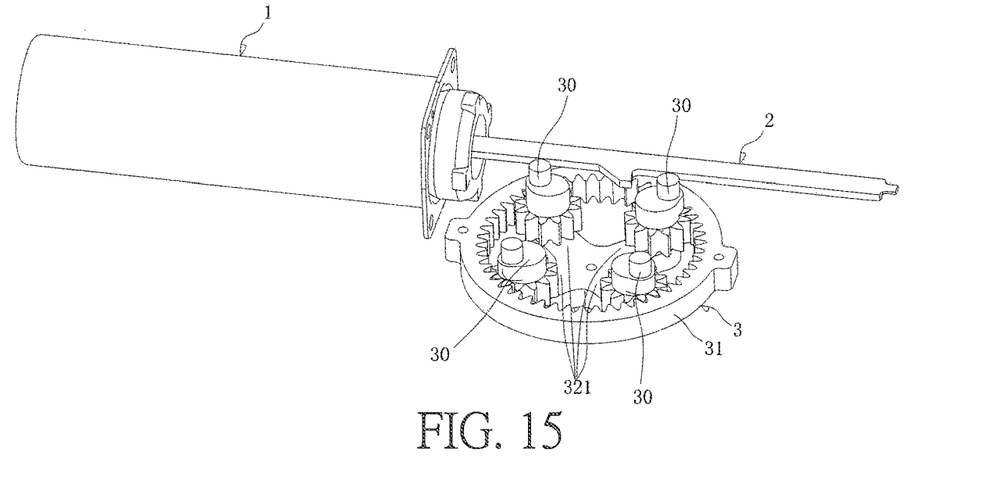
FIG. 15 is an internal structure diagram of the present invention (gear ratio is 4:1, four planetary gear-connecting rod assemblies)

Similarly, it can be seen from the previous analysis that when the ratio of the reference diameter of the annular gear 31 to the reference diameter of the planetary gear 33 is 4:1, that is, when the gear ratio is 4:1, two, three, and four planetary gear-connecting rod assemblies can be distributed along the circumference of the crank, as shown in FIGS. 13-15, and giving priority to the distribution angle between two adjacent planetary gear-connecting rod assemblies to be greater than or equal to 90°. As shown in FIG. 13, two planetary gear-connecting rod assemblies are distributed along the circumference of the crank, and giving priority to the distribution angle of these two assemblies greater than or equal to 90°, here 180°, can fully use the two sides of the approximate quadrilateral to push the impact unit. As shown in FIG. 14, three planetary gear-connecting rod assemblies are distributed along the circumference of the crank, and giving priority to the distribution angle of these three assemblies greater than or equal to 90°, here 120°, can fully use the three sides of the approximate quadrilateral to push the impact unit. As shown in FIG. 15, four planetary gear-connecting rod assemblies are distributed along the circumference of the crank, and giving priority to the distribution angle of these four assemblies greater than or equal to 90° can maximize the use of the four sides of the approximate quadrilateral to push the impact unit separately. It is possible to further increase the number of planetary gear-connecting rod assemblies, but this will cause the distribution angle between the assemblies less than 90°, and the driving stroke between the assemblies will overlap, which is not conducive to the improvement of efficiency. Therefore, in this situation, the number of planetary gear-connecting rod assemblies should be less than or equal to 4.

It is easy to draw a general inference that when the gear ratio is n:1, multiple planetary gear-connecting rod assemblies 30 can be distributed in the driving mechanism. Giving priority to the number of planetary gear-connecting rod assemblies to be less than or equal to n, and also the distribution angle of the planetary gear-connecting rod assemblies greater than or equal to 360/n°, it can improve the efficiency of the driving mechanism, compared to only one planetary gear-connecting rod assembly distribution.

Figure 16:
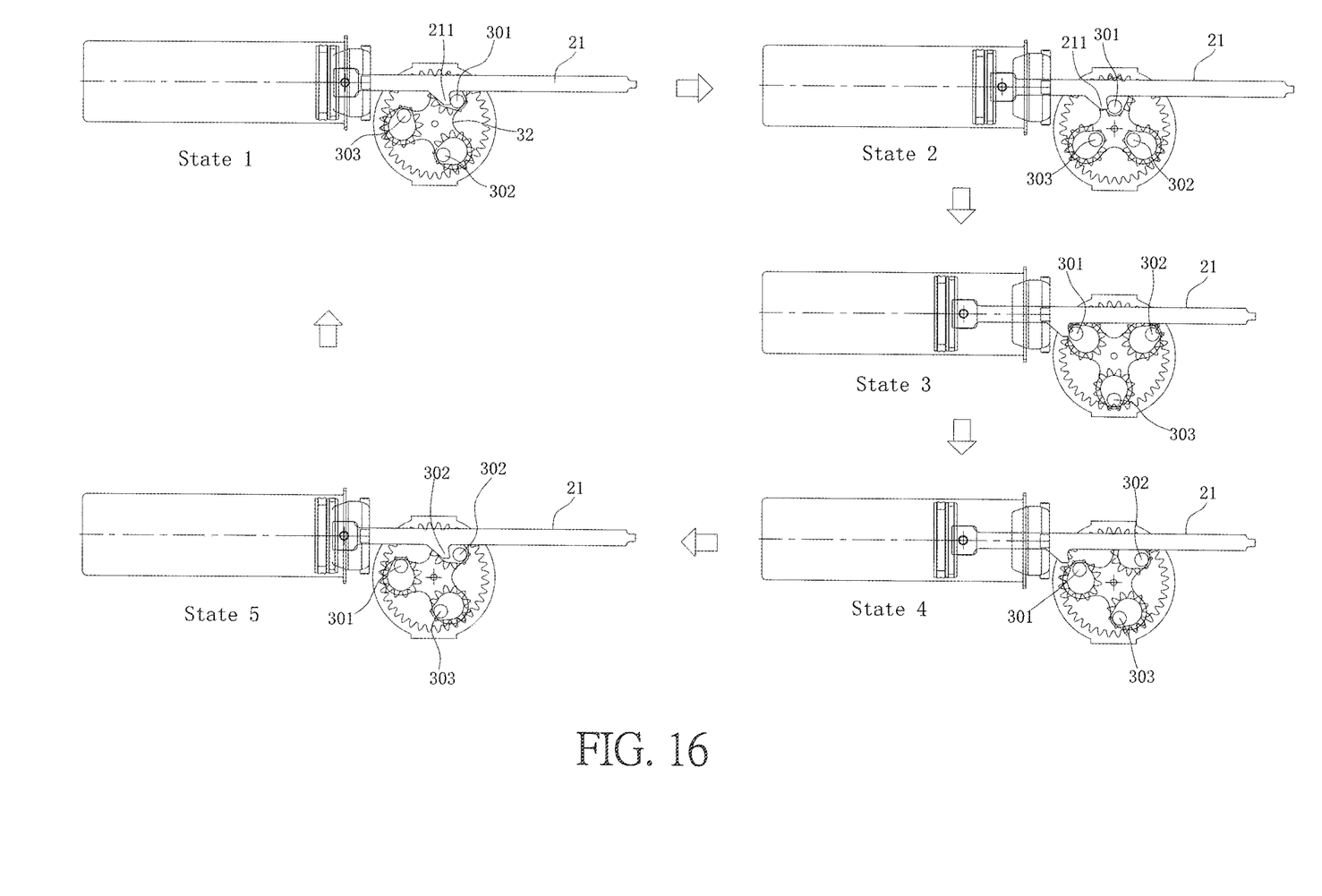
FIG. 16 is an internal structure diagram of the present invention (gear ratio is 3:1, three planetary gear-connecting rod assemblies)

In summary, the operation principle and flow process of the present invention are described here by taking three planetary gear-connecting rod assemblies distributed along the circumference with a gear ratio of 3:1 as an example, wherein the gear ratio refers to the ratio of the reference diameter of the annular gear to the reference diameter of the planetary gear. As shown in FIG. 16, assume the output shaft 43 drives the crank 32 to rotate counterclockwise. When rotating to state 1, the impact unit is located at the lower dead center, and the first planetary gear-connecting rod assembly 301 starts to mesh mechanically with the impact unit; continuing rotation, the driving mechanism uses one side of the approximate triangle to push the impact unit to compress the energy storage unit from state 1 to state 3 in sequence in order to achieve energy storage. When the impact unit reaches near the upper dead center (state 3), the crank continues to rotate, and the first planetary gear-connecting rod assembly moves along the other side of the approximate triangle, thereby achieving the separation of the connecting rod from the impact unit (state 4). When the connecting rod is separated from the impact unit, the impact unit performs external work under the force of the energy storage unit, driving the fasteners from the nail guide plate into the workpiece (state 5), thus completing a work cycle. As the crank continues to rotate, and the second planetary gear-connecting rod assembly 302 begins to mesh mechanically with the impact unit, thus repeating states 1 to 5 to complete the second work cycle. By analogy, three work cycles can be completed by one revolution of the output shaft.

Similarly, when the gear ratio is 4:1 and four planetary gear-connecting rod assemblies are distributed along the circumference, four work cycles can be completed by one revolution of the output shaft. In general, if the gear ratio is n:1 and the number of planetary gear-connecting rod assemblies distributed along the circumference is less than or equal to n, less than n work cycles can be completed by one revolution of the output shaft.

In the previous examples of multiple planetary gear-connecting rod assemblies, each planetary gear-connecting rod assembly can complete a full compression stroke. When the gear ratio is n:1, one revolution of the output shaft can complete less than or equal to n work cycles. In fact, it can also be designed such that multiple planetary gear-connecting rod assemblies jointly complete a compression stroke. Each element completes a section of the compression stroke, and each section of the stroke in turn completes a complete compression stroke. In order to smoothly achieve the relay of each section of the stroke, the impact unit needs to mesh with each planetary gear-connecting rod assembly with appropriate distribution angle between the planetary gear-connecting rod assemblies.

Figure 17:
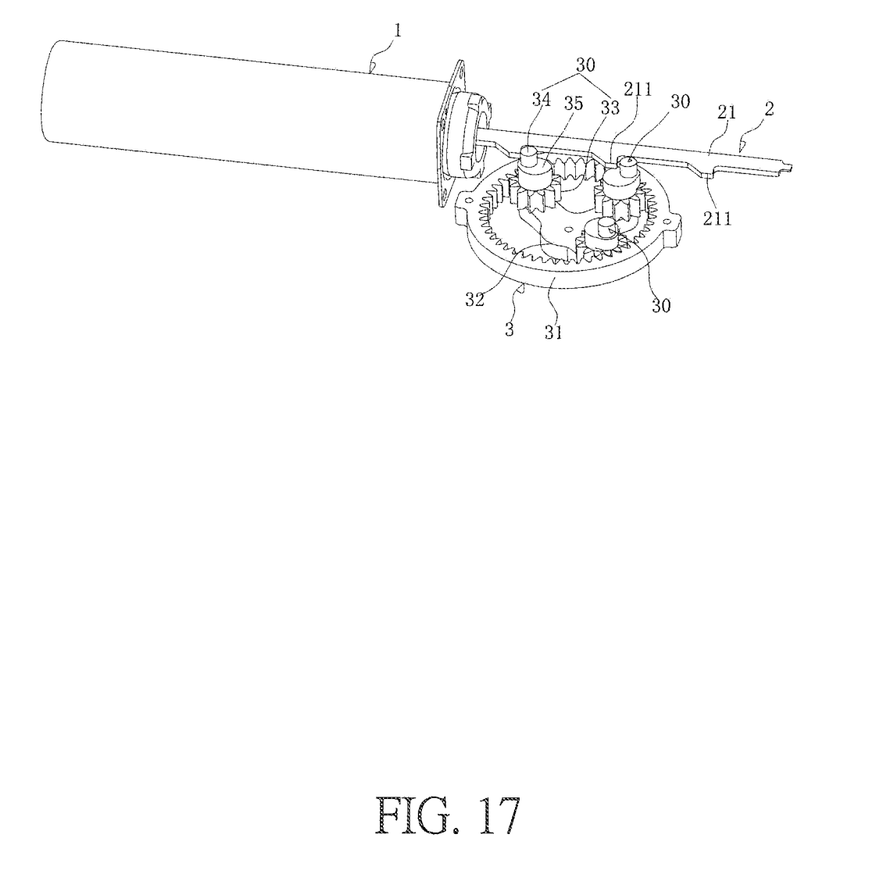
FIG. 17 is an internal structure diagram of the present invention (gear ratio is 4:1, three planetary gear-connecting rod assemblies)

Taking a gear ratio of 4:1 as an example, multiple planetary gear-connecting rod assemblies can be distributed along the circumference. The priority is to give the number of these assemblies less than or equal to 4. Further increase of the number of the assemblies is not conducive to the improvement of driving efficiency. As shown in FIG. 17, three planetary gear-connecting rod assemblies distributed along the circumference are selected. The included angle of each assembly is 90°, and the remaining 90° is taken as the avoidance angle to prevent the impact unit from collision with the driving mechanism when moving towards the direction of work application. There are three serrated features on the impact unit that mesh with each planetary gear-connecting rod assembly. The choice of the avoidance angle is related to the rotation speed of the crank and the moving speed of the impact unit when performing external work. It is easy to deduce that when the gear ratio is n:1, n planetary gear-connecting rod assemblies can be distributed along the circumference. If the avoidance angle is 0 and the number of the planetary gear-connecting rod assemblies is m, the preferred included angle between the assemblies is (360°−θ)/m. It is worth noting that the included angles between the planetary gear-connecting rod assemblies do not need to be equal, but the priority is designed to be equal to make the structure simple.

Figure 18:
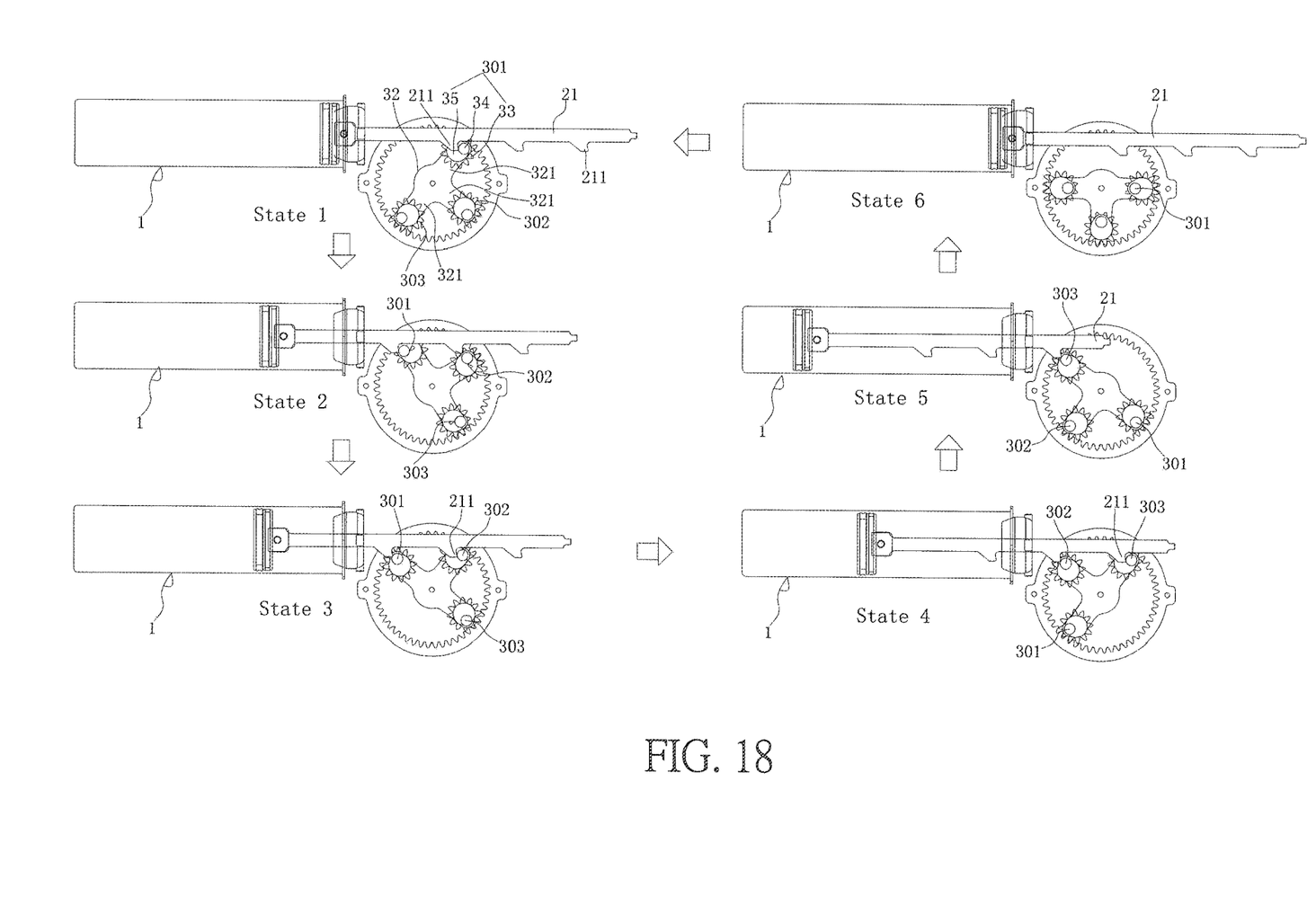
FIG. 18 is an internal structure diagram of the present invention (gear ratio is 4:1, three planetary gear-connecting rod assemblies).

FIG. 18 shows the working process of the mechanism having three planetary gear-connecting rod assemblies distributed on the circumference with a gear ratio 4:1. Assume the output shaft drives the crank to rotate counterclockwise. When rotating to state 1, the impact unit is located at the lower dead center, and the first planetary gear-connecting rod assembly 301 starts to mesh mechanically with the impact unit; further rotating, the driving mechanism uses one side of the approximate quadrilateral to push the impact unit to compress the energy storage unit to state 2. The crank continues to rotate, the first planetary gear-connecting rod assembly 301 and the impact unit 2 are about to disengage, and the second planetary gear-connecting rod assembly 302 begins to engage with the impact unit, as in state 3. The crank 32 continues to rotate, the second planetary gear-connecting rod assembly 302 is disengaged from the impact unit 2, and the third planetary gear-connecting rod assembly 303 meshes with the impact unit 2, as in state 4. The crank continues to rotate, and the third planetary gear-connecting rod assembly 303 pushes the impact unit to near the upper dead center (state 5). The crank continues to rotate, and the third planetary gear-connecting rod assembly 303 moves along the other side of the approximate quadrilateral, thus achieving the disconnection of the connecting rod from the impact unit (state 5). As the connecting rod is separated from the impact unit, the impact unit performs external work under the force of the energy storage unit and returns to the lower dead center (state 6). The output shaft continues to drive the crank to rotate and return to state 1, thus completing a work cycle.

In summary, the present invention uses the annular gear-crank-planetary gear structure to achieve the conversion of rotary motion into reciprocating motion, and the unbalanced load is much smaller than that of the traditional crank-connecting rod structure, which can minimize the friction force of movement under load, avoid wear, ensure the stability and smoothness of the impact unit operation, and improve the working quality. In addition, the quick release of the driving mechanism is achieved without detaching the components, which simplifies the structure and has extremely strong market competitiveness.

What is claimed is:

1. A fastener driving machine comprising:
an energy storage unit;
an impact unit used to drive the energy storage unit to store energy and withstand the energy released by the energy storage unit to drive a fastener into a workpiece;
a driving mechanism, which is connected to the impact unit;
a rotating power mechanism, which is connected to the driving mechanism to provide rotating power to the driving mechanism;
wherein the driving mechanism comprises:
 a stationary annular gear;
 a crank connected to the rotating power mechanism;
 a planetary gear connected to the crank in a spinning manner and revolves with the rotation of the crank relative to the annular gear; and
 an engaging shaft fixedly connected to the planetary gear to transmit a torque between the planetary gear and the engaging shaft and to push the impact unit, wherein the engaging shaft is an extension of the planetary gear and the engaging shaft rotates together with the planetary gear, wherein the planetary gear is placed in the annular gear to mesh with the annular gear, wherein the engaging shaft rotates together with the planetary gear, wherein a trajectory of a center of the engaging shaft travels in a non-circular motion around an axis of the annular gear, and wherein disengagement of the engaging shaft from the impact unit is a function of a relative position of the engaging shaft and the impact unit as the planetary gear revolves relative to the annular gear.

2. The fastener driving machine of claim 1, wherein the ratio of rotation angle to revolution angle of the planetary gear is (1:1)-(7:1) or (0.1:1)-(0.5:1), and wherein the crank comprises one or more connecting arms, each connecting arm comprising a respective planetary gear, and each respective planetary gear comprises a respective connecting rod fixed thereto, and each respective connecting rod comprises a respective engaging shaft to form one or more respective sets of planetary gear-connecting rod assemblies.

3. The fastener driving machine of claim 1, wherein the ratio of the reference diameter of the annular gear to a reference diameter of the planetary gear is (2:1)-(8:1) or (1.1:1)-(1.5:1).

4. The fastener driving machine of claim 1, wherein the engaging shaft is connected to the planetary gear via a connecting rod, and the engaging shaft is mounted on the connecting rod.

5. The fastener driving machine of claim 1, wherein the rotating power mechanism comprises a motor, a rotating shaft of the motor is an output shaft, and the crank is connected to the output shaft; or the rotating power mechanism comprises a reducer, a motor installed to match with the reducer, and an output shaft installed on the reducer, the crank is connected to the output shaft, and the reducer is provided with several layers of planetary gear transmission modules.

6. The fastener driving machine of claim 1, wherein the impact unit comprises an impact rod, a side of the impact rod comprises a groove, the engaging shaft is placed in the groove; or the side of the impact rod comprises a convex tooth, and the engaging shaft is meshed with the convex tooth.

7. The fastener driving machine of claim 1, wherein the energy storage unit is any one of an air spring, a mechanical spring, a rubber element, or a vacuum device; wherein, when the energy storage unit is an air spring, the energy storage unit comprises a cylinder block and a piston installed in the cylinder block; and wherein one end of an impact rod of the impact unit is fixedly connected to the piston, and the other end of the impact rod extends out of the cylinder block.

8. The fastener driving machine of claim 1, further comprising a nail guide plate and a nail cartridge arranged at a lower end of the nail guide plate for conveying fasteners to the nail guide plate, the nail guide plate comprises a passage for an impact rod of the impact unit to pass through.

9. The fastener driving machine of claim 1, further comprising a plurality of planetary gears and a respective plurality of engaging shafts.

* * * * *